Nov. 7, 1961              F. H. GAZIN              3,007,212

SEMI-PERMANENT HOUSING FOUNDATION

Filed Dec. 26, 1957                            2 Sheets-Sheet 1

INVENTOR.
FELIX H. GAZIN
BY Robert O. Wright

ATTORNEY

Nov. 7, 1961   F. H. GAZIN   3,007,212
SEMI-PERMANENT HOUSING FOUNDATION
Filed Dec. 26, 1957   2 Sheets-Sheet 2
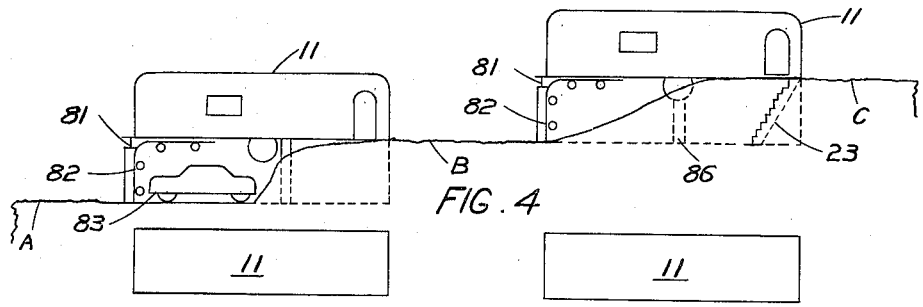
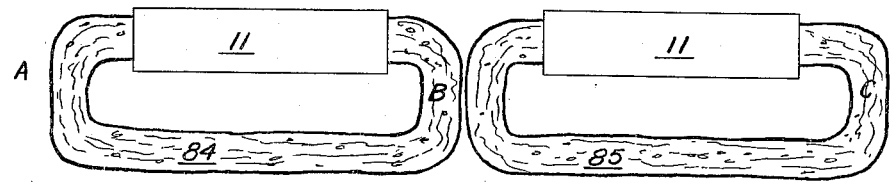
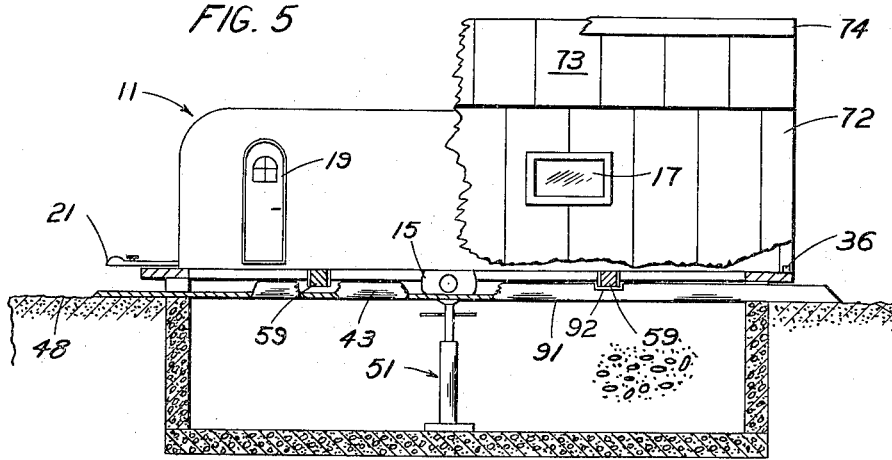
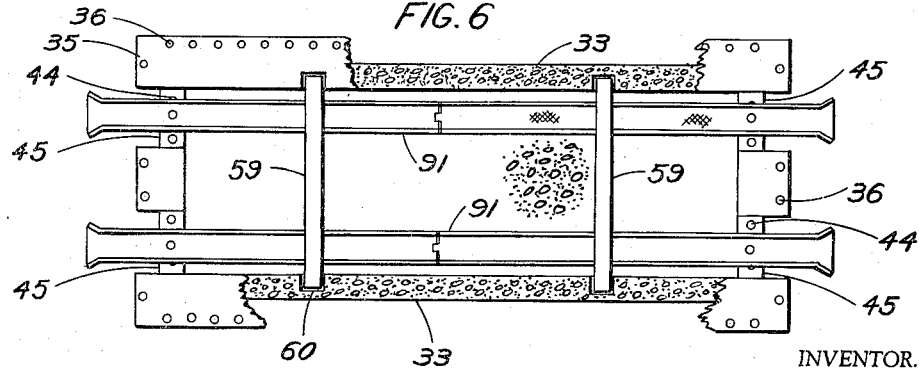
INVENTOR.
FELIX H. GAZIN
BY Robert O. Wright
ATTORNEY United States Patent Office 3,007,212
Patented Nov. 7, 1961

3,007,212
SEMI-PERMANENT HOUSING FOUNDATION
Felix H. Gazin, River Road, Mtd. Rte., Rome, N.Y.
Filed Dec. 26, 1957, Ser. No. 705,322
3 Claims. (Cl. 20—2)

This invention relates to mobile homes or trailers and more particularly concerns the means for insulating a trailer and for providing additional storage space when the trailer is providing a residence of a permanent nature.

In the colder areas during winter, living for extended periods in trailers has sometimes been uncomfortable due to the heat leakage, especially through the floor of the trailer. Further, additional space is usually desired.

The primary object of the present invention is to provide an improved combination of trailer and a drive-over foundation structure whereby better insulation of the trailer floor and, at the same time, more storage space are provided. Another object is to provide such a foundation-trailer in combination with side insulating walls. A further object is the provision of a terraced trailer park having drive-over foundation which can be used as garages. An additional object is to provide an insulating drive-over cellar foundation combined with a trailer having stairs which give access to the cellar. Another object is to provide adjustable and removable tracks and support means in a drive-over trailer foundation so that the tracks and supports can be adjusted to different width wheels and can be used with other drive-over foundations. A further object is the provision of a trailer foundation having full-length or part-length tracks which cooperate with or without openings in the end walls or end wall so that a trailer can be moved over the foundation and then lowered to be supported by the foundation whereby an insulating and storage, play or living quarters basement results.

Realization of the above objects by this invention and the features and advantages thereof will be apparent from the following description and accompanying drawings of the invention in which:

FIGURE 4 is a side elevation outline of terraced trailer park having three levels and trailer-foundation structures providing garages;

FIGURE 5 is a top outline view of the FIGURE 4 trailer park and shows roads for locating the trailers and using the garages;

FIGURE 6 is a side view of a trailer-foundation having tracks extending the length of the foundation and shows parts of the insulating enclosure at a trailer window and the trailer supported after the tires have been deflated; and FIGURE 7 is a top view of the FIGURE 6 foundation and shows the openings at both ends for the wheels of the car and trailer.

Figure 1:
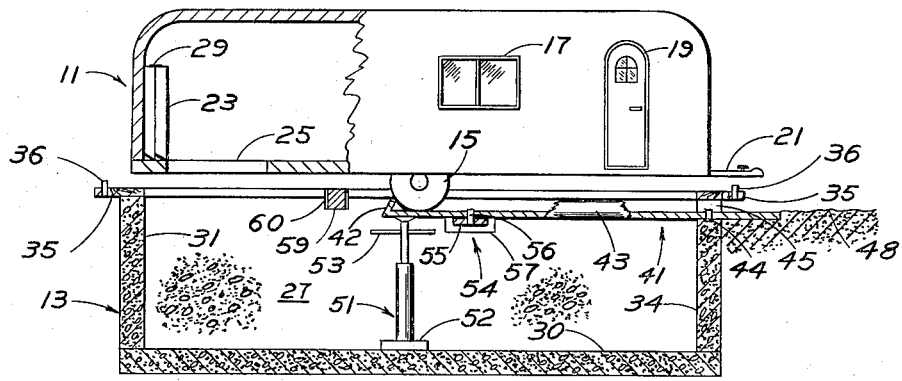
FIGURE 1 is a partially cross-sectioned side view of a trailer positioned on tracks over and above a foundation so that the trailer can be lowered onto the foundation by means of jacks and further shows folded stairs and an opening therefor in the cross-sectioned rear of the trailer.
Figure 2:
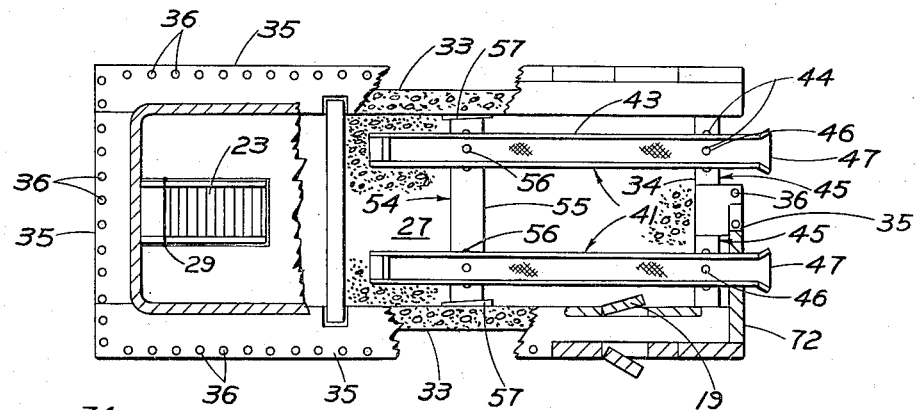
FIGURE 2 is a top view showing the rear part of the trailer with stairs leading to the basement, the tracks positioned in front openings of the foundation, and insulating side panels and a door panel mounted on the front part of the foundation.

With reference to FIGURES 1 and 2 a house trailer 11 is shown positioned over and on a basement foundation 13 which generally conforms to the bottom edge outline of the trailer 11. The trailer 11 has the usual two or more wheels 15 at midlength and spring structure (not shown) for supporting the trailer body. The trailer has conventional windows 17, door 19, and trailer hitch 21. The trailer 11 unconventionally has stairs 23 at the rear and a stair opening 25 in the floor for providing access to the basement 27. The stairs 23 are, for instance, folded at the center by means of hinges 29 so that they fit vertically and can be pivoted through the opening 25.

The foundation 13 is comprised of a floor 30, back wall 31, two identical side walls 33 and a front wall 34. The concrete walls have wide sills 35 on the tops thereof which extend outwardly of the outer edges of the walls. The sills have upwardly projecting removable plugs 36 for mounting side insulating panels thereon as will be described. Illustratively, the inner dimensions of the foundation are: height, seven feet; width, nine feet; and length, twenty-nine feet. With these dimensions a ten-by-thirty trailer is positioned to overlap, or extend six inches onto the foundation. The front wall and sill may have two openings 45 therein through which the wheels of different-width spacing can pass. It should be understood, however, that for certain applications the tracks could be placed on the top edge of the foundation without any opening and after the trailer is positioned thereon, the tracks lowered in the usual manner until the trailer rests securely on the foundation. In this case there probably would be an inward and downward slope to the tracks.

Within the foundation 13, two thick tracks 41 having inner end bumpers 42 and side wall guides 43 are supported. The outer end support for the tracks is at openings 45 which have four short upwardly-extending plugs 44 in the bottoms of the openings 45. (See FIGURE 2.) The tracks 41 have openings 46 which fit onto one of the four plugs 44. The spacing of the plugs 44 is such that the tracks can be positioned to accommodate different-width trailer wheels.

The tracks 41 also may have flared entrance portions 47 for facilitating the movement of the trailer wheels into the tracks from the ground 48 which is advantageously level with the tracks so that the trailer will be horizontal as it passes through the openings 45. When the tracks are at the top of the wall the level need not be as accurately controlled. The other inner ends of the tracks 41 are supported upwardly by two jacks 51 which have a removable base 52 and handle 53. Means 54 are also provided to prevent the tracks 41 from moving laterally. Means 54 is comprised of wide plank 55 having two sets of four upwardly-projecting plugs 56 and wedges 57. The wedges and ends of plank 55 have complementing inclined surfaces so that the plank can be readily wedged between the side walls and dislodged. The four plugs 56 provide for width adjustment corresponding to the adjustment at the front openings 45. A cross support 59 is removably supported in recesses 60 in the side walls 33 to support intermediately the floor of the trailer. Two or more such cross supports can be provided as shown in FIGURES 6 and 7. As required, these cross supports are placed in position after the trailer is positioned and lowered so as not to block the tracks or not to be interfered with by the tracks when in position. Narrower or shorter trailers than described can thus be supported.

Figure 3:
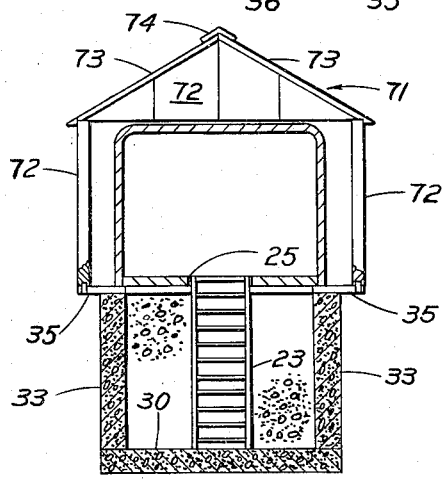
FIGURE 3 is a transverse view toward the rear of the trailer and shows the stairs for the basement and an insulating sectionalized enclosure which has its side panels attached to the top of the foundation.

The trailer 11 is positioned on the foundation 13 by moving the trailer wheels 15 onto the tracks and through the openings 45 to the proper location and then removing the lateral supports 54 and lowering the jacks 51 so that the trailer rests on the rear and side walls of the foundation and then the center of the front wall 34. It is to be noted that the openings 45 are of such depth as to permit a horizontally-level trailer to pass from the level ground 48 without interference with the bottom of the trailer by the foundation and with a minimum clearance to the desired location of the trailer over the foundation. With such construction, lowering the trailer into position is facilitated and the lateral support, jacks and tracks can be removed through the openings 45. It is apparent that, when the trailer is positioned as shown in FIGURE 3, an insulating basement is provided; and, since the trailer has means giving access to the basement, additional storage space is provided which is free of vertical posts. The lateral support, jacks and tracks are then used to place another trailer.

Trailers of less width than ten feet can be adequately supported by means of cross support 59 which is a wood or steel beam and fits into open-top recesses in the side walls. With this construction, the side walls and beam provide vertical support for the back of the trailer together with the center part of the front wall after the tracks are removed. Trailers of less than thirty feet can also be supported since the back of the trailer and the front center of the trailer are supported. Suitable panels (not shown) are then provided to close the openings between the trailer and the foundation.

In FIGURE 3 the trailer 11 is shown resting on the top of the foundation 13. Jacks 51 have been lowered permitting the rear end and then the front end to rest on the foundation 13 as above described. The stairs 23 have been unfolded and lowered through opening 25 to rest on the basement floor 30 thereby providing the above-noted access to the basement 27. For additional insulation, an enclosure 71 is provided for the exposed top and sides of the trailer 11 and is comprised of side, back and front panels 72 mounted by openings on the removable plugs 36 in the wide sills 35 and roof panels 73 constructed with notches to fit on the outer edge of the side panels and to form a peaked roof with a roof cap 74. Suitable special panels (see FIGURE 2) are provided for the front wall in view of the trailer hitch 21 and the openings 45. It is to be noted that these panels will be held by the inner plugs 36 at the front ends of the side walls and the plugs 36 on the center sill part of the front wall 34. Other special panels are provided for alignment with windows 17 and door 19 (see FIGURES 6 and 2) so that light is admitted and access to the door 19 is provided. All side panels 72 are mounted on plugs 36 and together with roof panels 73 provide a sectional enclosure giving insulation including a dead-air space. The side panels and roof sections are interconnected by suitable means (not shown) and constitute closure means which is readily assembled on the foundation and changed to fit the differing window-door patterns of trailers.

In FIGURES 4 and 5, a modification of the invention is illustrated. The basic concept of the trailer mounted on a basement foundation is combined with a trailer park which is terraced into at least three levels A, B, C. The floor of the basement is at one ground level A and the back wall has an upper I beam 81 and a conventional overhead door 82 so that at least part of the basement formed by the foundation and the bottom of the trailer 11 become a garage for a car 83. Roads 84 and 85 are provided between the three ground levels A, B, C at the ends thereof so that the car for a particular trailer can place or remove its trailer at level B or C and then use the garage under its trailer at level A or B. In this arrangement the trailer has side stairs 23 and an opening therefor in the front part of the trailer, and the inner front part of the basement will be closed off from the garage by a wall 86.

It is to be understood that a plurality of the FIGURE 1 foundations without garages are arranged in a level trailer park with rows similar to those shown in FIGURE 5. Since the jacks, tracks and lateral support means are readily removable, they can be used to place trailers on the other foundations.

In FIGURES 6 and 7 another modification is illustrated. Parts similar to those previously described have like reference numerals and hence will not be redescribed. This modification has tracks 91 extending from front to back so that a car can pull a trailer 11 from left to right rather than backing the trailer onto the tracks as with previously-described modifications. Cross supports 59 are positioned in their recesses and through openings 92 in side guides 43 of the tracks after the trailer is properly positioned. Jacks 51 provide center support during the positioning of the trailer. In order to lower the trailer 11, its tires 15 are deflated (as shown) or the wheels may be removed so that the trailer rests on the foundation 13. It is to be noted the clearance provided the depth of openings 45 permits lowering of the trailer as described. Part of the side panels 72, roof sections 73 and roof cap 74 are shown. The manner in which jacks 51 and tracks 91 are removed through openings 45 or the window or door is as above described. Cross supports 59 also function as above described.

It is understood that persons skilled in the art can make changes in the disclosed embodiments without departing from the invention as defined in the appended claims.

I claim:

1. A semi-permanent housing arrangement for providing an insulating-storage basement for a trailer comprised of a generally-rectangular foundation which conforms to the bottom outline of a trailer and has front, back and side walls with wide tops, said front wall having identical openings therein, the depth of said openings being such that a trailer can be moved horizontally on its wheels through said openings without the trailer bottom contacting the front or side walls, ground support extending from the outer bottom edge of said openings, a plurality of tracks having the outer ends thereof mounted in said openings, a jack within said foundation supporting each of the inner ends of said tracks at the level of the bottoms of said openings, said outer ends being removably attached to the bottoms of said end wall openings, transverse support means arranged to prevent lateral movement of said tracks extending from said tracks to said side walls, said openings, tracks, jacks and the tops of said walls being so constructed and arranged that a trailer having wheels at mid-length can be moved through said openings and positioned on said tracks with the edges of the trailer above said walls and then lowered onto said walls by lowering said jacks whereby said tracks and jacks can be removed.

2. The arrangement according to the preceding claim 1 and further characterized by the ground level at the face of the back wall being at the bottom of the back wall and the back wall having a garage door therein whereby the basement forms a garage.

3. A semi-permanent housing arrangement for providing an insulating-storage basement for a trailer of the type having a built-in collapsible stairway mounted in one end adapted to be lowered into a basement thereunder, comprising in combination a generally rectangular foundation which conforms to the bottom outline of a trailer and has front, back and side walls with wide tops; said front wall having at least two openings therein, the depth of said openings being such that a trailer can be moved horizontally on its wheels through said openings without the trailer bottom contacting the front or side walls; a plurality of tracks having the outer ends thereof mounted in said openings; jack means within said foundation supporting each of the inner ends of said tracks at the level of the bottoms of said openings; said outer ends being removably attached to the bottoms of said end wall openings; transverse support means arranged to prevent lateral movement of said tracks extending from said tracks to said side walls, said openings, tracks, jacks and the tops of said walls being so constructed and arranged that a trailer having wheels at approximately mid-length can be moved through said openings and positioned on said tracks with the edges of the trailer above said walls and then lowered onto said walls by lowering said jacks whereby said tracks and jacks can be removed and said collapsible stairway lowered for access to said insulating-storage basement.

References Cited in the file of this patent

UNITED STATES PATENTS

| | | |
|---|---|---|
| 963,918 | Miller | July 12, 1910 |
| 1,357,022 | Bahls | Oct. 26, 1920 |
| 2,193,550 | Coe | Mar. 12, 1940 |
| 2,212,757 | Stout | Aug. 27, 1940 |
| 2,241,830 | Tourtellotte | May 13, 1941 |
| 2,722,040 | Ludowici | Nov. 1, 1955 |

FOREIGN PATENTS

| | | |
|---|---|---|
| 1,010,146 | France | Mar. 19, 1952 |
| 745,618 | Great Britain | Feb. 29, 1956 |

OTHER REFERENCES

Wood Frame House Construction, U.S. Dept. of Agriculture, p. 15, Handbook No. 73, February 1955.